July 31, 1934.     A. S. KNAPP     1,968,404
WAFFLE IRON
Filed Aug. 12, 1930     4 Sheets-Sheet 1

INVENTOR
ANDREW S. KNAPP
BY
ATTORNEY

July 31, 1934.  A. S. KNAPP  1,968,404
WAFFLE IRON
Filed Aug. 12, 1930  4 Sheets-Sheet 2

INVENTOR
ANDREW S. KNAPP
BY
ATTORNEY

July 31, 1934.   A. S. KNAPP   1,968,404
WAFFLE IRON
Filed Aug. 12, 1930   4 Sheets-Sheet 3

INVENTOR
ANDREW S. KNAPP
BY
ATTORNEY

July 31, 1934.                A. S. KNAPP                1,968,404
                              WAFFLE IRON
                         Filed Aug. 12, 1930        4 Sheets-Sheet 4
FIG. 6
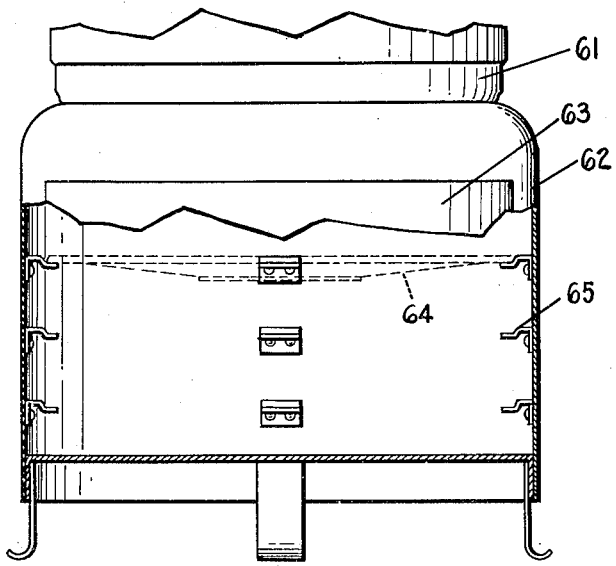
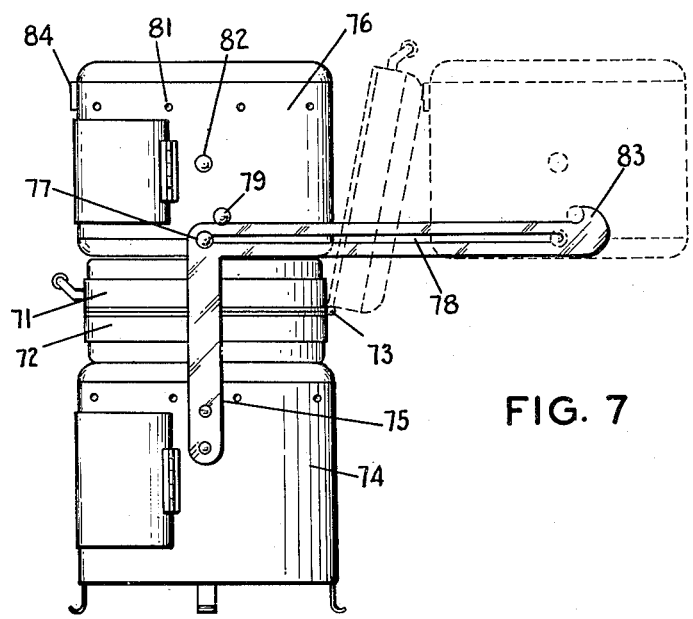
FIG. 7
INVENTOR
ANDREW S. KNAPP
BY
ATTORNEY Patented July 31, 1934

1,968,404

UNITED STATES PATENT OFFICE 1,968,404

WAFFLE IRON

Andrew S. Knapp, St. Louis, Mo., assignor to Knapp-Monarch Company, a corporation of Missouri Application August 12, 1930, Serial No. 474,735

2 Claims. (Cl. 219—19)

My invention relates to waffle irons, and more particularly to a waffle iron arranged for storing a number of waffles and preserving them in good condition until desired for consumption.

In waffle irons as now almost universally used in homes, and also in small restaurants and the like, it is only possible to prepare one waffle at a time, unless more than one waffle iron is used, and where it is desired to serve more than one person such an arrangement means that all persons cannot be served simultaneously; or, if they are, the first waffle prepared has become tough or soggy. This is due to loss of the original crispness and the accumulation of moisture of condensation on the plate beneath the waffle.

In the home where there are four or more persons to be served at a meal, some one will be occupied continuously during the meal in making and serving waffles as fast as they are cooked, and, without overcoming the disadvantage that all persons are not served simultaneously.

By my invention I provide ways and means whereby a number of waffles may be cooked in advance of the time of serving, just as other food is cooked in advance of a meal, and kept in perfect palatable condition ready to serve as wanted.

If a second service of waffles may be desired, the same can be cooked and stored in the same manner as rapidly as they are cooked, without regard to whether or not the persons are ready to be served at that time.

My invention therefore contemplates providing a waffle iron with one or more compartments adapted for the storage of the prepared waffles.

My invention further contemplates a construction and arrangement of parts in such a waffle iron that will permit ready insertion and removal of the waffles from the compartment and insure preserving the waffles in good condition ready for use when desired.

Other and further objects of my invention will be understood from the following specification taken in conjunction with the accompanying drawings, wherein—

Fig. 6 is a side view, partly in section and parts broken away, of a further modified form of my improved waffle iron, and Fig. 7 is a side view of a still further modified form of my invention in which compartments 60 are arranged both above and below the cooking irons.

Figure 1:
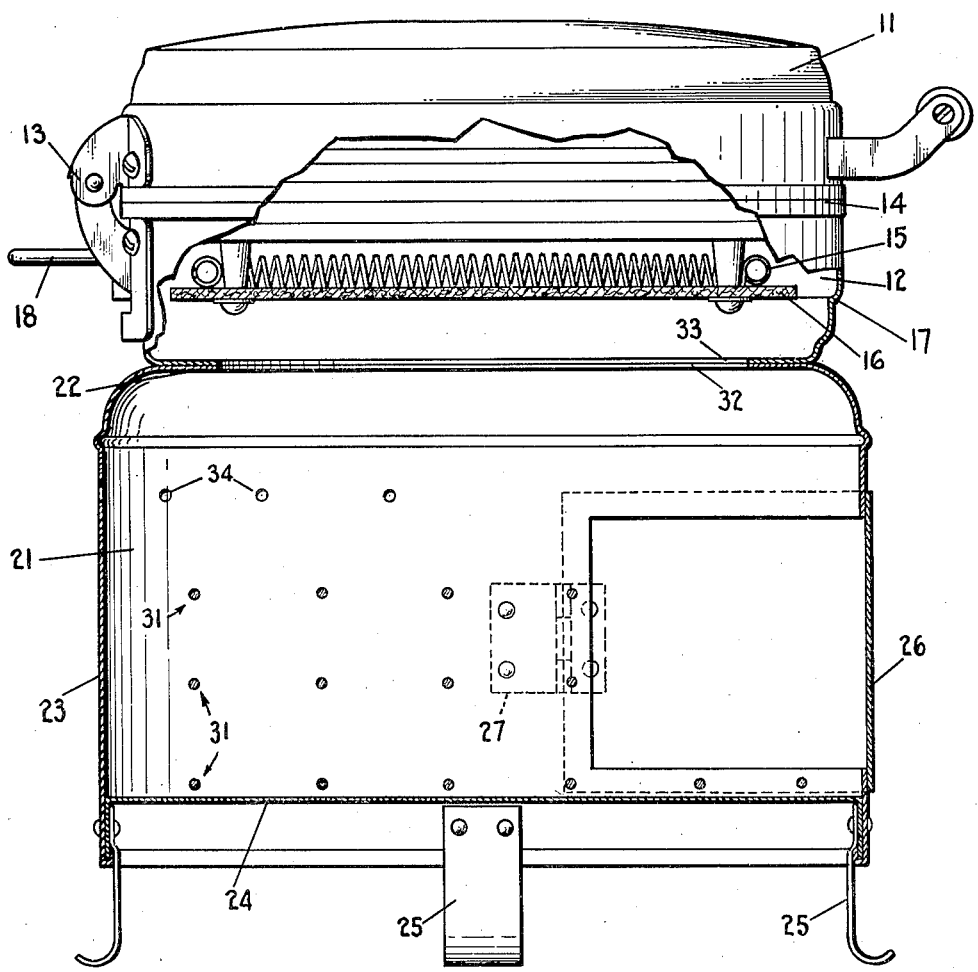
Figure 1 is an enlarged view of my improved waffle iron, parts being shown in section and parts being broken away to facilitate the illustration.
Figure 2:
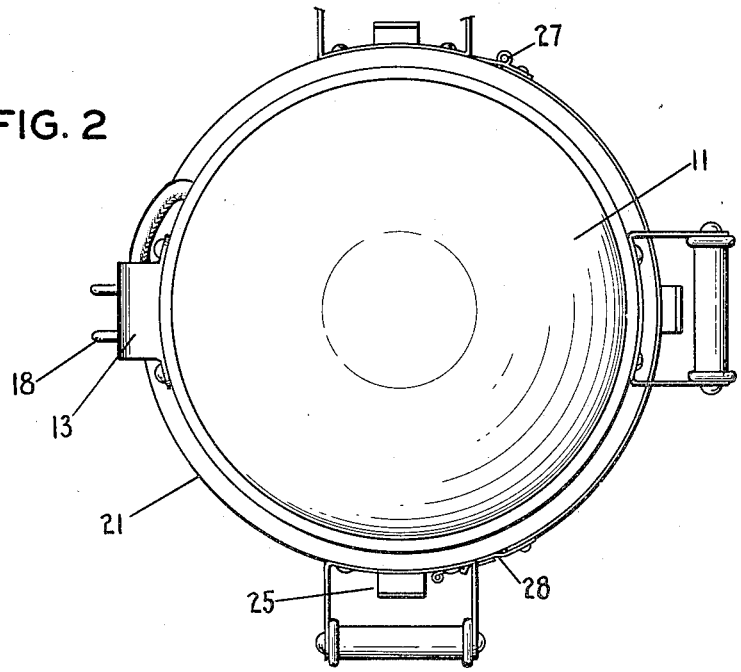
Figs. 2 and 3 are respectively a plan and a side view of my improved waffle iron shown in Fig. 1.
Figure 3:
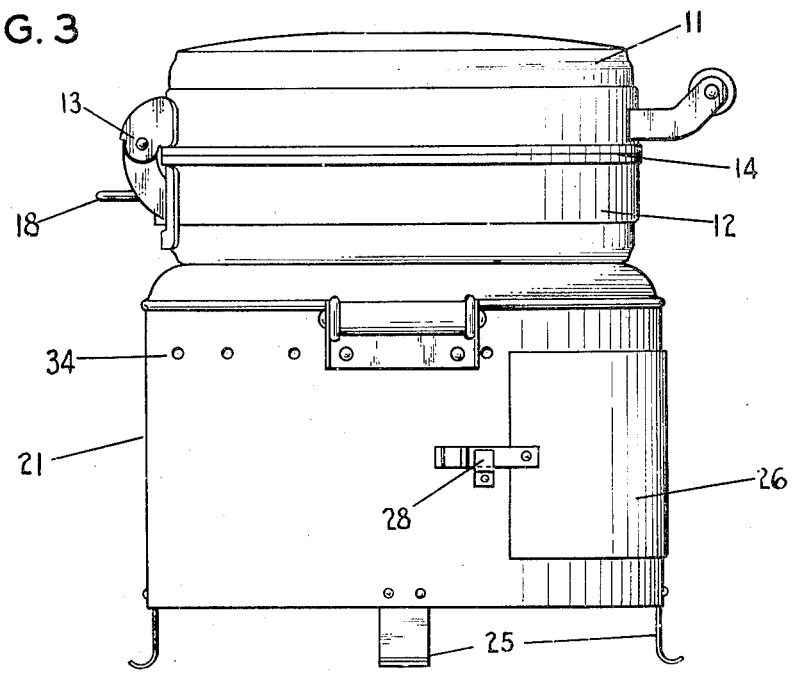

Referring to Figs. 1, 2 and 3 of the drawings, I have shown a well known form of waffle iron comprising an upper section 11 and a lower section 12 hinged together as indicated at 13 with the customary loose motion hinge. Each of the sections 11 and 12 comprises a cooking iron or plate 14, the surface of which is patterned to form the usual waffle surfaces. In back of the plate is an electrical heating element 15, which may be shielded on the outside, by an asbestos plate 16 to direct the heat toward the cooking plate 14. The whole construction is housed in an enclosing shell 17. An electrical connection plug 18 is mounted on one of the sections, and the two heating elements are connected to the plug so as to be heated simultaneously when the waffle iron is connected to the source of current, such as the house lighting circuits.

The sections of my improved waffle iron are mounted upon a hollow base or compartment 21 so that the lower section closes or completes the top wall 22 thereof. The base also comprises side wall 23 and bottom wall 24, and the whole may be supported upon feet 25. The side wall 23 has an opening therein closed by a door 26 that is hinged at one side, as indicated at 27, and latched at the other side, as indicated at 28. The form of all of the foregoing parts is by way of example only.

It will be noted that the door extends around more than one-third of the circumference of the base 21 so as to permit ready and easy access to the interior of the base with ample room for introducing a circular waffle into the base.

Inside the hollow base 21 I provide a plurality of shelves 31 for receiving and retaining the prepared waffles. Each shelf is formed of a plurality of wires extending cross-wise the door opening and in lateral alignment with each other, the wires being soldered or otherwise secured to the side wall 23. This type of shelf is chosen so as to provide ventilation on both sides of the waffle and thus prevent any "sweating" beneath the waffle that would cause sogginess or toughness.

I have found that in addition to arranging the shelves 31 so as to hold the prepared waffles in spaced apart relation to each other, it is advisable and desirable to heat the base 21 so as to preserve the waffles crisp and warm while awaiting service. It is important that only sufficient heat be provided to accomplish the desired purpose, since too much heat will dry out the waffles and render them brittle, which condition is likewise undesirable.

For this purpose, I arrange the upper wall 22 of the base with a large opening 32, with which a corresponding opening 33 in the shell 17 of the lower waffle iron section 12 registers to permit the heating of the air in the base and the lower shell 17 by the heating unit 15. Since the major portion of the heat from the element 15 is necessary for cooking the waffle, the plate or shield 16 is imperforate and extends beyond the outer limits of the heating element 15 so that the heat is concentrated and reflected toward the lowermost cooking plate 14. However, it will be noted from Fig. 1 that the plate 16 in the lower section 12 does not extend to the side walls of the shell 17, leaving a space therebetween so that the heating element is exposed to the air in the shell 17 and the hollow base 21 and will gradually heat the same. Thus the waffles that are placed upon the shelves 31 are maintained heated, crisp and palatable, the condition when removed from the irons 14, until ready for use. This arrangement does not involve any concentration of heat in the base 21. Hence, there is no likelihood of the waffles stored in the base to become dried out or brittle, but it is to be noted that it is preferable to have a dry waffle than a damp and soggy waffle. In practice I have found the above described arrangement to be proper for accomplishing the objects sought.

The placing of freshly cooked waffles in the entirely enclosed base 21, heated as it is, would have a tendency to create a vapor or steam, the condensation of which might destroy the original crispness of the waffle. To prevent this I provide a few vent holes 34 in the side wall 23 of the base 21. These should not be many in number or too large in capacity but only sufficient to relieve the humidity of the air in the base 21.

Figure 4:
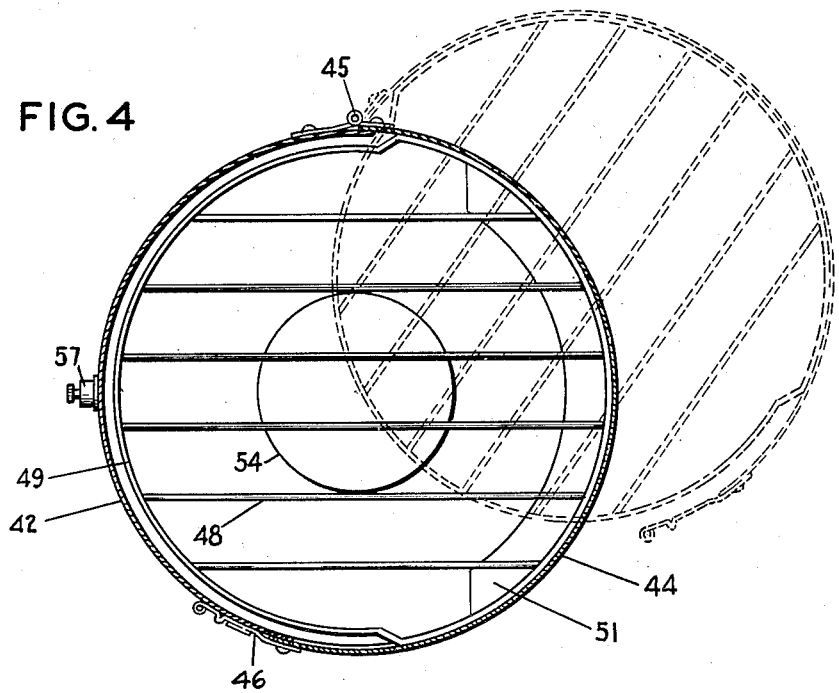
Figs. 4 and 5 are plan and side views respectively of a modified form of my improved waffle iron, parts being shown in section, and parts being broken away.
Figure 5:
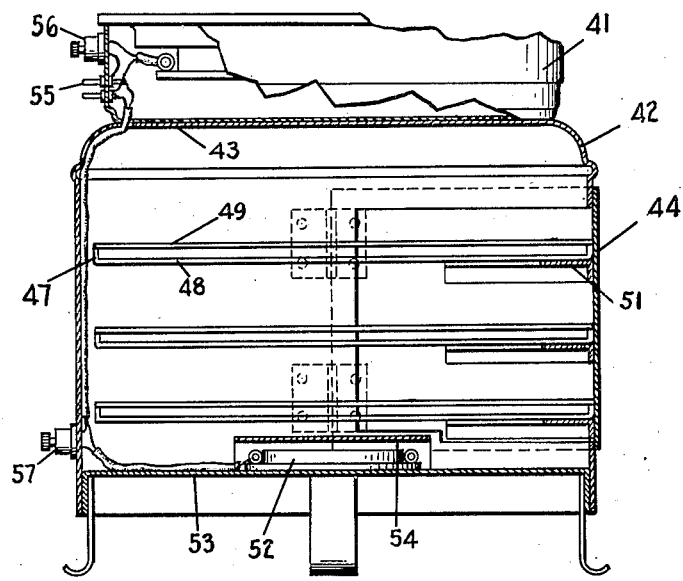

Referring now to the forms shown in Figs. 4 and 5, the waffle iron is shown broken away and indicated generally at 41 as mounted on top of a hollow base 42. In this form the hollow base 42 is closed by a door 44 which is hinged at one side as indicated at 45, and is latched at the other side as indicated at 46, the hinging and latching being shown more or less diagrammatically. A plurality of shelves 47 are carried by the door 44 so as to swing therewith, the relative closed and open positions of which are shown by the full lines and dotted lines respectively in Fig. 4.

Each shelf is formed of a plurality of parallel wires 48 extending inwardly from the door 44. The wires 48 are bent upwardly very slightly at the respective ends and secured to a substantially circular wire ring 49 so as to form a sort of shallow tray in which the waffle is deposited. The shelves or trays 47 are secured to the door 44 by soldering or welding, or the like, and beneath each tray may be placed one or more supporting brackets 51, if desired.

It will be noted that the door 44 extends more than half way around the circumference of the base 42 so that the side walls do not interfere with the trays 47 as the door 44 is opened and closed. Thus, as a waffle is cooked upon the irons 41, the door 44 is opened, and the waffle is deposited in one of the trays 47 whereupon the door is closed, enclosing the waffle in the base 42. It is apparent a sliding drawer arrangement could be substituted for the door and attached trays described above.

In this form the top wall 43 of the base is entirely enclosed so that the base is not heated as in Fig. 1. Since it is desirable, as above set forth, to have a small degree of heat in the compartment where the waffles are stored, I have indicated that a very low wattage heater 52 may be located on the bottom wall 53 of the compartment 42. This heater could of course be mounted along the side wall of the compartment if desired. A shield 54 is provided over the heater 52 so as to keep the direct radiation of heat from the heater to the adjacent waffle.

It will be noted that the circuit to the heater 52 extends from the connecting plug 55 for the waffle iron 41 so as to be in parallel circuit with the cooking heaters. The circuit to the heating elements in the waffle iron 41 is controlled from the switch 56 while the circuit to the auxiliary heating element 52 is controlled separately and independently by the switch 57. This arrangement is provided so that if all the trays 47 are filled, the circuit to the cooking heaters can be disconnected but the circuit to heater 52 can be continued so that the compartment 42 will nevertheless be sufficiently heated to maintain the waffles in a proper and palatable condition as explained above.

In Fig. 6 is indicated a still further modification. In this figure, the waffle iron is indicated generally at 61, and the hollow base at 62. The construction of the door 63 for closing the base 62 may be readily understood from the description that has preceded. In this form, the hollow base 62 is arranged for the insertion of plates for holding the waffles, which may be the plates upon which the waffles are to be served. A plate is indicated in dash lines at 64, and each plate is supported upon three spaced brackets or lugs 65 secured to the side wall of the base 62.

The base 62 may be heated by either of the two methods heretofore described or in any other convenient manner.

When using this form of the invention, it will be advisable to insert the plates 64 in the base 62 before the waffles are cooked so that the plates will be heated before the waffles are placed thereon and thus the tendency for sweating to occur between the under side of the waffle and the plate will be avoided.

In place of the spaced supporting lugs 65 a supporting rail might be provided but in any event it is desirable that arrangements be made to leave a space between the edge of each plate and the side wall of the base 62 thus permitting the circulation and heating of air throughout the base 62. One way to do this is to provide the lugs 65 with an offset portion 66 on which the plates rest.

In Fig. 7 I have provided for locating a compartment above the waffle iron, and I have illustrated this in conjunction with the form of device shown in Figs. 1 to 3 inclusive, so as to illustrate how to provide a large capacity storage for cooked waffles, for use in restaurants and like places. However, the use of two compartments is purely optional. Since the upper section of the waffle iron is movable to permit pouring of the batter and removal of the cooked waffle, it is necessary that the upper compartment shall be movable to an out of the way position when opening the waffle cooking irons.

In this figure, the waffle iron is indicated at 71 and 72 for the upper and lower halves respectively which are hinged together as indicated at 73. The waffle iron is mounted upon a hollow base 74, which for the purpose of this description may be assumed to be of the same construction as that indicated in Figs. 1, 2 and 3, so that the compartment 74 is heated as defined in connection therewith.

Mounted on opposite sides of the base 74 are a pair of L-shaped supporting brackets 75, one leg of which extends upwardly above the waffle iron, and the other leg of which extends rearwardly thereof. A compartment 76 is provided with a pair of roller pins 77 which engage in slots 78 in the rearwardly extending arms of the brackets 75 and these together with the roller pins 79, which engage the upper surfaces of the rearwardly extending arms of bracket 75, serve to support the compartment 76. In the full line position indicated in Fig. 7, the compartment is heated from the hot air rising from the waffle iron, which air may be admitted into the compartment 76 through an opening in the bottom of the compartment somewhat similar to the opening 32 in the top wall of the base 21 in Fig. 1. The compartment 76 is vented by means of the holes 81.

When it is desired to pour batter upon the waffle cooking iron 72, or to remove a cooked waffle therefrom, the compartment 76 is slid rearwardly, by means of the handles 82 provided on opposite sides of the compartment 76, until the roller pin 79 engages stop 83 on the end of the rearwardly extending arm 75, whereupon the compartment 76 will occupy the position shown by dash lines in Fig. 7. Then the upper section 71 of the waffle iron may be lifted and permitted to rest against a pad or stop 84 provided on the front wall of the compartment 76. When the upper section is returned to the full line position then the compartment 76 may be slid forwardly to the full line position indicated.

It will be understood that a waffle iron may be made having the upper compartment only whereupon the vertical arm of the bracket 75 could be connected to the supporting base for the waffle iron. It will also be understood that various constructions may be provided for supporting the upper compartment 76 so as to permit opening of the waffle iron sections, the construction shown in Fig. 7 being by way of example only.

From the foregoing it will be seen that I have provided several constructions, each of which accomplish the desired result of providing a waffle iron with means for storing cooked waffles prior to and preparatory to serving of the same, thus permitting a number of people to be served simultaneously. This eliminates a serious draw back and disadvantage in the use of waffle irons in the home today, and enables the accomplishment of that desired result with only one waffle iron.

Modifications may be made in the arrangement and location of parts within the spirit and scope of my invention, and such modifications are intended to be covered by the appended claims.

I claim:

1. In combination, a waffle iron comprising a stationary cooking element, a movable cooking element hinged to the stationary cooking element, electrical heaters for said cooking elements, a hollow enclosed base upon which the stationary cooking element is mounted, the stationary cooking element and base having intercommunicating openings, a shield between said openings and said electrical heaters, heat from said heaters passing around said shield and through said openings, said base being provided with a plurality of supports upon which waffles may be placed in horizontal position and a door on said base.

2. In combination, a waffle iron comprising a pair of cooking elements hinged together, electrical heaters for said cooking elements, a storage compartment comprising a hollow enclosed base upon which the waffle iron is mounted, means of communication between said electrical heaters and said base, a shield between the two but leaving the edges of the heaters indirectly exposed to the contents of the base and said contents receiving heat radiated from the heaters, a door on said base and a plurality of horizontal shallow trays carried by said door.

ANDREW S. KNAPP.